May 29, 1962 C. WEBER 3,036,608

PORTABLE SUPPORTING AND MOUNTING DEVICE FOR POWER TOOLS

Filed April 20, 1959 3 Sheets-Sheet 1

INVENTOR
Carl Weber
BY John F. Brezina
ATTORNEY

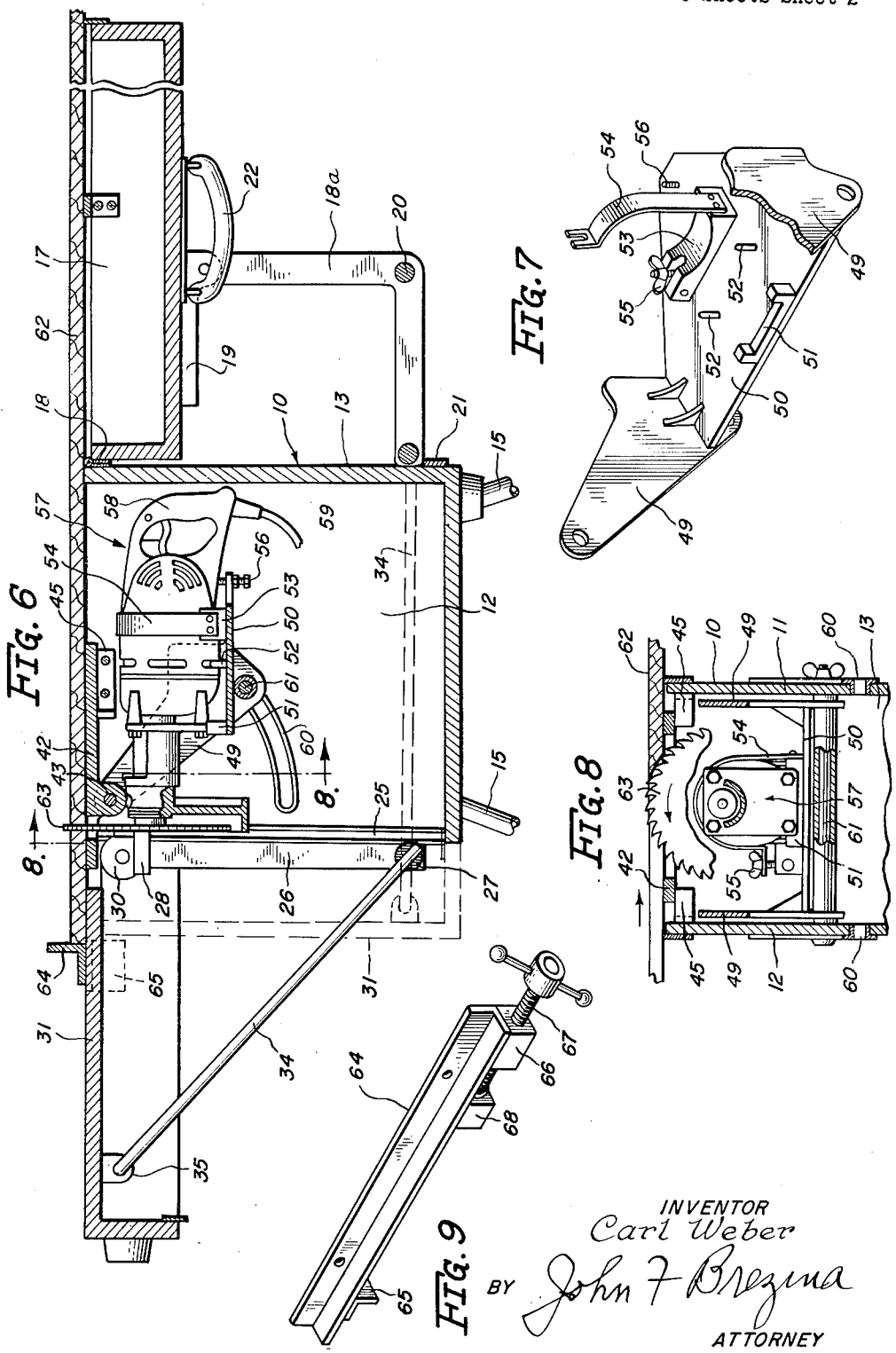

May 29, 1962 C. WEBER 3,036,608
PORTABLE SUPPORTING AND MOUNTING DEVICE FOR POWER TOOLS
Filed April 20, 1959 3 Sheets-Sheet 3
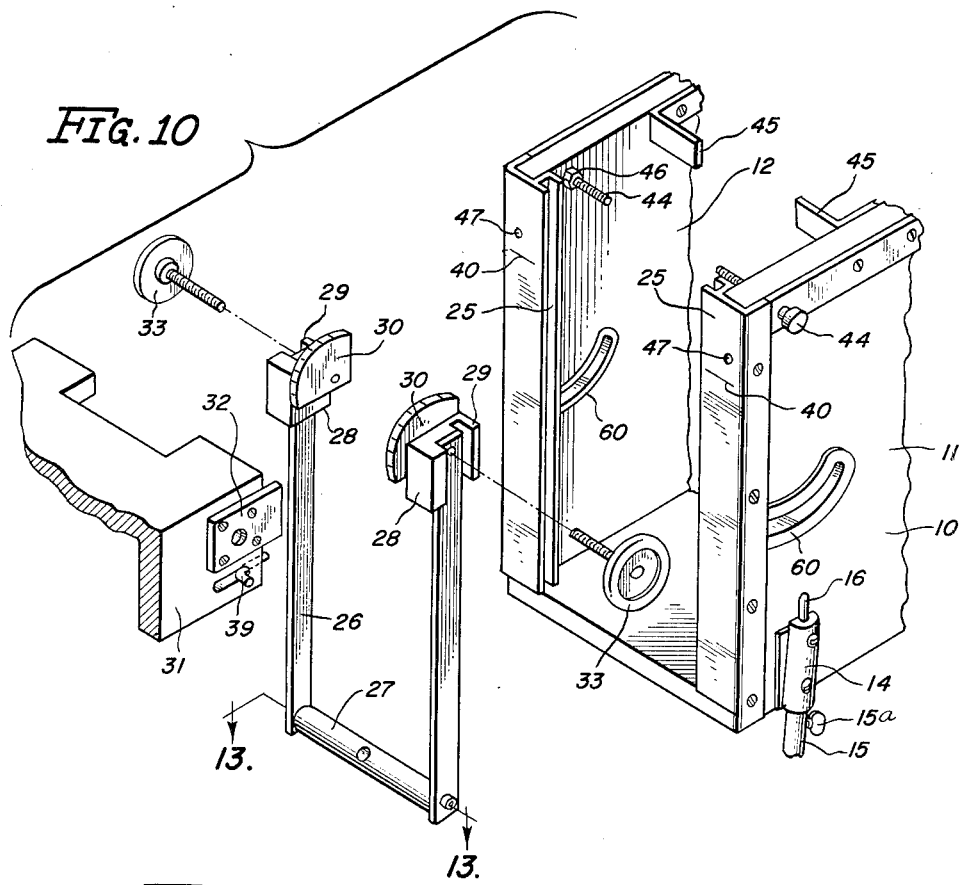
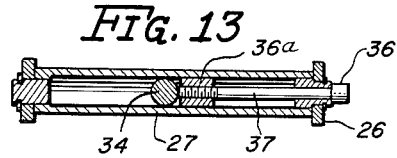
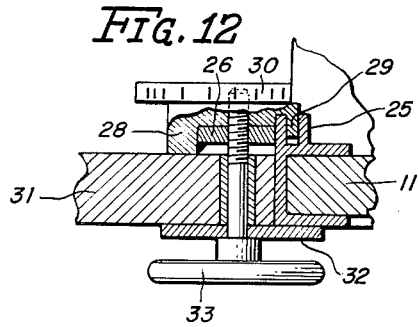
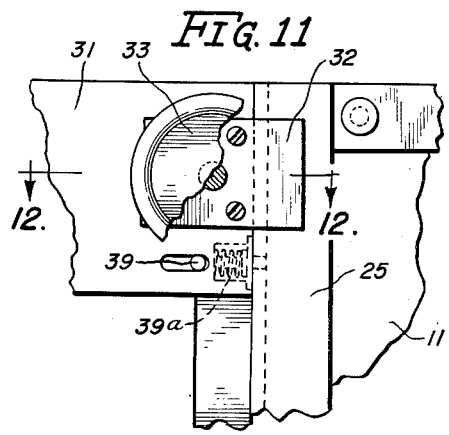
INVENTOR
Carl Weber
BY John F Brezina
ATTORNEY

United States Patent Office 3,036,608
Patented May 29, 1962

3,036,608
PORTABLE SUPPORTING AND MOUNTING
DEVICE FOR POWER TOOLS
Carl Weber, 1201 Lowe St., Algonquin, Ill.
Filed Apr. 20, 1959, Ser. No. 807,566
4 Claims. (Cl. 144—285)

This invention is directed to a novel portable supporting and mounting device for power saws and power tools.

The objects and accomplishments of my invention are:

(a) To provide a portable, easily assembleable working and holding support for a portable saw or portable power tool which is adapted for drilling, routing, sanding, cutting and other work operations in which the portable unit may be adjustably mounted in different positions to perform different operations.

(b) To provide a portable, foldable working and holding support or cradle for portable power tools such as saws or the like and which has adjustably clamping and holding means for the power unit and, which has a vertical adjustable and tiltable extension on which a part of the work is to be performed, and which has a second work supporting member which forms the front of the box and which is removably and adjustably connected to the end portions of the side walls of the main container which latter member provides a closure or cover, when closed, for the main container.

(c) To provide a portable disassembleable device including a box-like container for a cradle-supported power tool which has a hinged cover and braces and brackets for holding said cover in open position in substantially alignment with the upper portion of the container to provide an enlarged work surface; and has a separate flat end section which is removable slidably mounted in the end of the container and which is adjustably mountable in horizontal position or in angular positions adjacent the end of the container to provide an additional work surface which may be positioned at different heights and different angles to facilitate performance of different operations or different work by the power driven tool adjustably mounted in the container, and which has an adjustably mounted saddle for the portable power tool and clamping means thereon.

A further object is to provide a portable dissassembleable device of the described class having portable detachable legs; having an adjustable mounting bracket which provides a stable platform on which the power unit may be oriented to the sides in an off-center position, and which has U-shaped brackets for orientation about the motor axis; having an adjustable cradle for adjustably holding the power unit and for rotation from the horizontal position through 45 degrees below the horizontal.

An object is to provide a portable device of the described class wherein the front wall of the box is slidably mounted relative to the main box and which is adapted to be adjustably positioned and held by cooperating vertical channels and by a bail-like pivotal member and angular braces.

On the drawings:

FIG. 6 is an enlarged partially cross-sectional view taken on a longitudinal plane illustrating the adjustable tables at the opposite ends thereof in upper extended position and illustrating the cradle holding the power tool in substantially horizontal position.

FIG. 7 is an enlarged perspective view, with parts broken away, of the adjustable cradle and clamping means for the power tool.

FIG. 8 is a cross section taken substantially on a plane indicated on line 8—8 of FIG. 6.

FIG. 9 is a perspective view of an adjustable ripping guide clamp adapted to be releasably mounted on the top of the upper table to guide work pieces during their movement.

FIG. 10 is a perspective and exploded view illustrating the end portions of the container; the vertically adjustable bracket means and, an end portion of the adjustable extension table.

FIG. 11 is an enlarged perspective view of a fragment of the upper and end portion of the main container and of a part of the extension table mounted adjacent thereto.

FIG. 12 is an enlarged cross-sectional view taken on a plane indicated by line 12—12 of FIG. 11.

FIG. 13 is a cross-sectional view taken on a transverse plane indicated by line 13—13 of FIG. 10 and illustrating the adjustable means for pivoting the extension table relative to the vertically slidable bracket.

As shown on the drawings:

Numeral 10 generally designates a box, or container, of relatively rigid construction and preferably made of wood or metal. Said box has a bottom and two vertical side walls 11 and 12 and one connecting end wall 13 which are suitably connected together at their respective conjunctures, for example by screws (not shown). The end of the box is at its front and the other end is open as hereinafter described.

Figure 1:
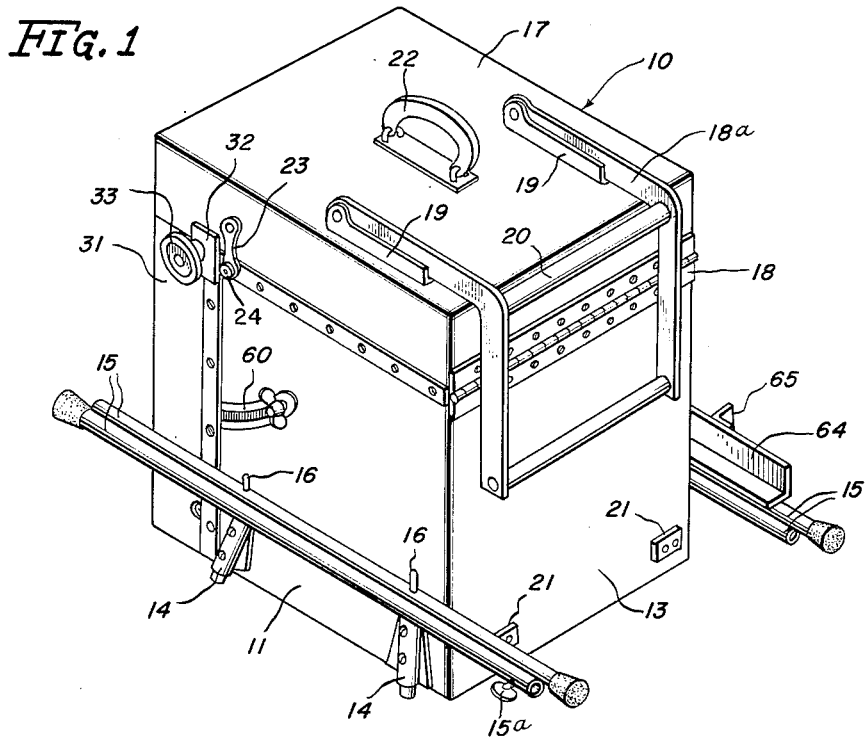
FIG. 1 is a perspective view of my portable and adjustable power tool supporting device.
Figure 2:
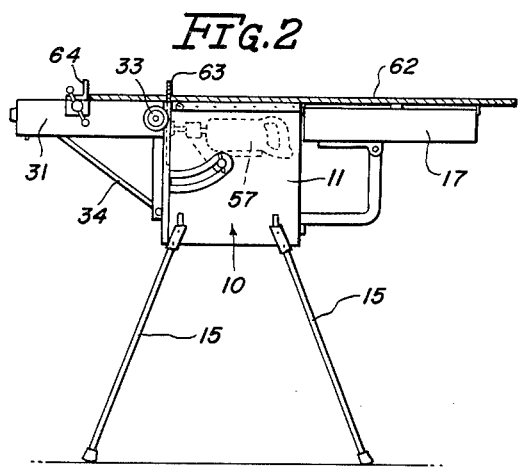
FIG. 2 is an end view illustrating the legs in mounted and supporting position.

Secured on each of the opposite two side walls 11 and 12 and on the lower part thereof are a pair of elongated metal mounting members 14 having studs thereon which are secured to said side walls by screws as indicated in FIG. 1 and in angular position such as illustrated in FIG. 1. Said mounting members 14 are adapted to have the upper end portions of four legs respectively removably mounted therein so that said legs 15 will extend outwardly and angularly as illustrated in FIG. 2 in which two of said legs are illustrated.

Said legs 15, when removed from supporting position, are adapted to be removably mounted along the lower exterior faces of the side walls 11 and 12 and releasably retained by hooks or clips 16, two of which are illustrated in FIG. 1. Each of said legs preferably are threaded at their normally upper ends and have a thumb screw 15a mounted therein whereby same are secured on the lower reduced stud portions of the mounting members 15.

A box-like cover 17 having opposite side walls and connecting end walls is hingedly connected to the upper edge of the end wall 13 by a piano hinge 18 and screws, as indicated in FIG. 1. Said cover when opened to its extreme position is adapted to rest with its upper edges in a plane in alignment with the upper edges of the box 10 as illustrated in FIG. 6. A pair of substantially right angled brackets 18a are pivotally connected at their upper ends to apertured mounting straps 19 as indicated in FIG. 1, said mounting straps being secured by screws (not shown) to said cover 17. Said angular brackets are preferably connected in their middle portions by a connecting pipe or link 20 as illustrated in FIGS. 1 and 6.

Mounted on the end wall 13 of the box 10 are two U-shaped upwardly opening metal brackets 21 which are secured by screws as illustrated in FIG. 1. When said cover 17 is fully opened, the free ends of said brackets 18a will seat in the brackets 21 respectively to thereby rigidly support said cover in an open position as illustrated in FIG. 6. Said cover preferably has a suitable handle 22 secured to the middle portion thereof as illustrated in FIGS. 1 and 6 to provide for relatively easy carrying of my tool supporting device.

Said cover 17 preferably has a pair of relatively short recessed locking plates 23 pivoted to the side walls of said cover which are adapted to releasably engage studs 24 secured on the side walls of said box respectively, only one of said locking plates 23 and studs 24 being illustrated in FIG. 1.

As indicated in FIGS. 6 and 10, a pair of metal recessed flanged grooved guide channels or guide tracks 25, which have apertures therein at spaced apart points, are secured by screws extending through the flanges thereof to the ends of the side walls 11 and 12, and in a position where said grooves or channels open inwardly and are parallel.

The U-shaped or bail-like metal bracket 26, which includes a lower transverse connecting passage rotatable bar 27 journalled in the lower ends of said bracket 26, has the upper ends of its legs secured by a rivet or the like to two slidable metal blocks 28. Each of said slidable blocks 28 has an extending lug or flange 29 integral therewith and which slide in the opposed grooves of guide tracks 25 respectively so that said bracket 26 is vertically slidable relative to said guide tracks 25. The upper ends of the legs of bracket 26 and said slidable blocks 28 have transversely extending aligned passages therethrough. Arcuate metal indicator plates 30 are secured on the inner faces respectively of said slidable blocks 28, as indicated in FIG. 10, and said indicator plates 30 also have holes in alignment with the holes through said slidable blocks 28.

A box-like end section having side walls and connecting end wall and designated as 31 has mounted on its side walls by screws or the like relatively short apertured metal plates 32, one of which is illustrated in FIG. 10. The side walls of section 31 are transversely apertured, and said end section 31 is adapted to be positioned between the indicator plates 90 of bracket 26, and pivotally connected relative to same and to said blocks by means of a pair of threaded hand screws 33, which in FIG. 10 are illustrated as in removed and separated position.

Figure 4:
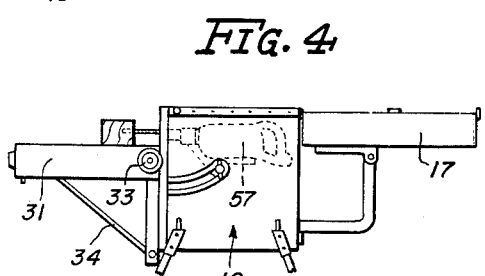
FIG. 4 is another end view of my supporting device illustrating the position of the cradle and power tool supported thereon in a substantially horizontal position, and with the adjustable end table in partially lowered position.
Figure 5:
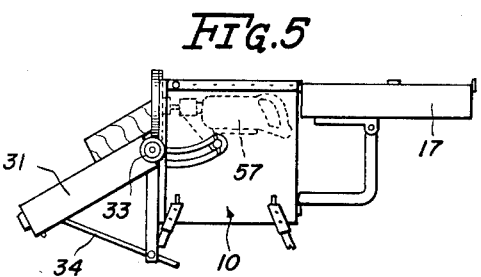
FIG. 5 is an end view of my adjustable device illustrating the cradle supporting a power tool such as a drill in horizontal position and illustrating the adjustable table mounted in angular position relative to the end portion of the main container.

It will be understood that said box end section 31 is pivotally mounted relative to the open end of the box 10 and with respect to the forward faces of the guide tracks 25, so that in lowered position said end section 31 will form a closure for the end of said box 10. Said end section 31 is adapted to be pivoted in varying angular positions from the horizontal to the extreme lowered position, for example as illustrated in FIGS. 4 and 5.

I provide means for adjustably supporting said end section in varying angular positions in providing a pivoted brace rod 34 pivoted to a secured ear 35 on said end section 31, and the lower end of said brace rod is adapted to slide in a center hole in the transverse tube 27 of bracket 26, and the said brace is adapted to slide into the box 10 when the end section is in fully lowered closing position, such as illustrated in dotted lines in FIG. 6. In order to selectively secure said brace rod in the desired position, there is provided a headed screw 36 which is threaded in the inner plug 36a in the passage of the tube 27. The inner end 37 of screw 36 releasably bears against the brace 34 to thereby hold said brace in the desired position, as illustrated in FIG. 13.

As illustrated in the left of FIG. 10, the side walls of the end section 31 are provided with slots and in which angular pins 39 are slidably mounted to selectively project the end portions of said pins into two upper apertures 47.

A pair of indicating marks 40 are formed on the faces of the guide tracks 25, which indicate the plane in which the axis of the motor shaft lies when in secured position.

As shown in FIG. 11, a spring 39a is mounted in a recess about each pin 39, and these are adapted to normally hold said pins in projected locked positions. When the end section 31 is moved vertically to any one of several selected positions and heights, the pins 39 are first retracted and then reseated to thereby hold said end section at varying heights and varying positions, two of which positions are illustrated in FIGS. 4 and 5.

The vertical adjustable positioning of the end section 31 is of great advantage in providing adjustable work piece supporting means for various operations, for example, to property position various parts of the work pieces to be worked on by drills, routers, sanding and grinding units driven from a chuck of the power unit mounted in the box.

I provide a pivoted cradle for adjustably mounting and positioning a prime mover, preferably an electric motor with driven chuck and housing and handle, in various angular positions relative to the upper work table and relative to the adjustably mounted end table section 31.

Numeral 42 designates a flat work table or work supporting plate or panel which has a pair of spaced apart apertured ears 43. Said work supporting table 42 is pivoted on inwardly extending pins 44, which said pins 44 are secured in horizontal position by threaded nuts 46 (one of which is illustrated in FIG. 10) to the side walls 11 and 12 of the box, as illustrated also in FIGS. 6 and 8. Said tiltable work panel 42 terminates short of the side walls of the box.

A pair of angular brackets 45 are secured by screws to the inside faces of the side walls of the box, as illustrated in FIGS 6 and 8 and one side portion of the work panel 42 rests on the projecting portions of said brackets 45 when in lowered position, as shown in FIGS. 6 and 8.

A pair of metal arms 49 having apertured ends are pivotally connected by pins to the two spaced apart ears 43 (see FIGS. 6 and 7). A platform or shelf 50 in the form of a metal plate is secured at its opposite ends to the free portions of the arms 49, as illustrated in FIG. 7. Secured on the forward end portion of the platform 50 is recessed saddle 51, into which a forward portion of the prime mover is adapted to seat and to be held against transverse movement.

Numeral 52 designates a pair of upwardly extending metal studs or pins which are adapted to be received by the side slots of the housing of an electric motor so that said motor will not shift either transversely or longitudinally during operation. Numeral 53 designates a recessed metal saddle to which is connected one end of a bifurcated flexible metal clamping strap or band 54. One end of saddle 53 has a bolt and thumb screw 55 thereon, and the bifurcated end of the clamping strap 54 is adapted to be mounted about the body of an electric motor of the prime mover and secured by thumb screw 55 to hold the prime mover in position.

As shown in FIG. 7 numeral 56 is an adjusting set screw threaded in the rear portion of the platform 50, and which is adapted to bear against the rear portion of a motor housing to provide for adjustably setting the prime mover to the proper angle relative to the said cradle formed by said arms 49 and platform 50.

Numeral 57 designates a conventional type of portable power unit having an electric motor and having handle 58 and with an electrical connection cable 59, and said prime mover of a type commoly referred to as a portable electric tool or drill.

As shown in FIG. 6, a pair of arcuate slotted holding members 60 are secured to the inner faces of side walls 11 and 12 respectively and on the outside of and adjacent to the respective arms 49. A threaded tie rod 61 with thumb screw is mounted to extend through the slots of members 60 and through the lower aligned apertures of arms 49, said rod having a thumb screw thereon whereby said arms and said cradle may be selectively positioned and held at varying angular positions from a normally horizontal position of the motor and downward. The said prime mover including electric motor 57 is thereby in an adjustable position so that it may be selectively held at varying angular positions relative to the work to be performed, which work may be temporarily supported at varying heights upon the adjustable work supporting section 31, or such work may be supported on the upper table 42, for example work such as the typical board 62 as illustrated in FIG. 6.

For example, when a board or the like is to be cut at an angle with a saw blade connected on the prime mover, such as saw blade 63 mounted on the driven chuck, the saw blade will cut at an angle relative to the work, according to the set angle of the prime mover.

In FIG. 9 I have illustrated in perspective a removable clamping type rip guide 64, which has a lower bracket 65 secured on one end thereof, and a threaded block 66 secured on its other end. A threaded screw or spindle 67 is threaded through block 66 and has mounted on its inner end a slidable thrust pad 68, which pad, when in mounted position impinges on the edge portion of the table extension 31 to thereby selectively mount said rip guide in desired position.

As illustrated at the right of FIG. 6, a removable wood panel such as the board 62 can be supported on the end members of the inverted open cover 17 to produce a flat work surface in alignment with the upper edges of the main container and with the flat table section 42.

Figure 3:
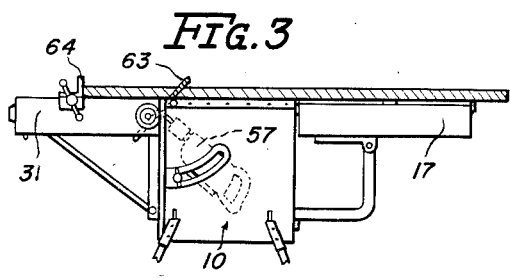
FIG. 3 is an end view of my device illustrating a power saw mounted in angular position and in a position to cut boards or the like at an angle.

In FIG. 8 I have illustrated a partially cross sectional view with the saw blade broken away, and showing the cradle and prime mover in horizontal position wherein the saw blade will be held in vertical position. Resetting of the cradle with its prime mover into different angular positions will correspondingly reset the saw blade at different angles. In FIG. 3, an angular inclined position of the saw blade is illustrated.

In FIG. 2 I have illustrated the fully open operating positions of the opened cover and the extendable table section 31 and with a saw blade 63 mounted on the prime mover and extending above the work surface.

In FIG. 4 I have illustrated the table section adjusted and reset to a partially lowered position to support a workpiece to be drilled or routed, as when a drill is mounted in the chuck of the prime mover. The adjustability of the position of the prime mover provides for drilling, routing or sanding at different angles.

The angular adjustability and setting of the pivoted table section 31, as illustrated in FIG. 5 provides for supporting the work pieces at varying angles to the work unit, such as a sanding disk, which is mounted in the chuck of the prime mover, to thereby present angular faces of the work pieces to the abrasive disk.

Another important accomplishment of my invention is that a relatively large and ample work support surface is provided when the device is in the extended position such as illustrated in FIGS. 2, 3, 4, 5 and 6, and at the same time, when the operator is through performing a particular kind of work desired, whether it be sawing, sanding, drilling, routing or the like, the extended table section 31 may be raised to its upper position; the brace rod 34 released and said table section lowered against the open end of the main container to the box illustrated in FIG. 1. At the same time, the operator may quickly and easily close the cover to locked position as illustrated in FIG. 1, and may remove the removable legs 15 and mount the same upon the hooks 16 provided along the opposite side walls of the container. The rip guide 64 may likewise be removed and mounted along the side wall of the device, and the entire device may be relatively easily carried and transported to various places for further use.

A further advantage is that the operator may easily change the type of working tool which is releasably mounted in the chuck of the electric prime mover, whether it be a cutting blade, a drill, a sanding disc, a router, or the like, and further the operator may, when the work requires it, quickly and easily remove the portable electric prime mover from its mounted position on the tiltable carriage by releasing the flexible strap 54 and removing the electric prime mover from its normal position thereon, and use said removed power unit as a portable tool.

Inasmuch as many changes could be made in the described construction and method, and as many apparently widely different embodiments of the invention within the scope of the claims could be constructed without departing from the spirit and scope thereof, it is intended that all matter contained in the accompanying specification shall be interpreted as being illustrative and not in a limiting sense.

I claim:

1. An adjustable device for adjustably supporting an electric prime mover; a box like container having parallel side walls, one end wall and having a stationary work supporting top; one end portion of said container being open; a pair of vertical guide channels at the open ends of said side walls, and having opposed inwardly opening grooves; a pair of blocks slidable in said guide channels; a U-shaped bracket connected to said slidable blocks and having a hole and transverse passage in its lower portion; an adjustable bolt in said transverse passage; a table section pivoted at one end to said slidable blocks, and being angularly adjustable and vertically movable; said table section being slidable with said blocks relative to said guide channels; said section being adapted to close the opening of said box between said guide channels; brace means pivotally connected to said table section for adjustably supporting said pivoted section at varying angular positions and adjustably mounted in said hole of said bracket and being selectively securable by said bolt to hold said table section in angularly adjusted positions; a pair of spaced apart depending ears on said work supporting top; a cradle pivoted to said ears and depending into said container, said cradle including a pair of depending arms and a platform thereon; slotted members mounted on the side walls adjacent said depending arms; manually adjustable connection means carried by said cradle and extending through said slotted members for selectively positioning said cradle in varying positions; and clamping means on said cradle for releasably holding an electric prime mover on said platform.

2. A portable holding and supporting device for electric power tools; a box like container having opposite side walls, one end wall and having its opposite ends open; a flat work supporting top on said box; a pair of opposed grooved guide tracks vertically mounted on the open ends of said side walls; a pair of blocks slidable in said guide tracks; a depending U-shaped bracket having leg portions connected to said slidable blocks respectively; the lower portion of said bracket having a hole and a passage therein; a bolt threaded in said passage; a work supporting end section pivotally connected at one end thereof to said slidable blocks; said blocks, said bracket, and said end section being vertically adjustable; means connected to said section for locking said section in desired position, including a pivoted brace slidable in said hole of said bracket; said bolt being adapted to engage said brace to hold same in varying positions; a cradle pivotally connected to said top and depending into the container; said cradle being adapted to support an electric power tool thereon; means for adjustably clamping said power tool on said cradle; and manually adjustable means for selectively holding said cradle at varied angular positions to thereby position the working portion of said electric power tool at varying angles relative to said top and relative to said section.

3. A supporting device for power driven saws and the like; a container having two side walls and a connecting end wall; a plurality of legs removably mounted on said container; a pair of opposed upwardly extending tracks the free ends of the side walls; a U-shaped frame member having lugs thereon slidably engaging said tracks, and adapted to be secured in varying positions; an end wall section pivotally connected at one end thereof to said lugs and to said frame member; said end wall section being adjustably positionable with said frame member adjustable hand screws for pivotally connecting said end wall section to the upper end of said frame member; brace means pivoted to said end wall for holding said end wall in extended positions and in varying angular positions relative to said container; said brace means slidably engaging the lower portion of said frame member, a screw on said frame member for engaging said brace means; a cover pivoted to the connecting end wall of said container; brackets on said cover for bracing said cover in open and extended position; a cradle adjustably and pivotally mounted in said container, and adapted to hold an electric prime mover in varied angular positions relative to the upper portions of said container; and a releasable clamp for holding said prime mover on said cradle.

4. A supporting device for power driven saws and the like; a box-like container having opposed side walls, bottom wall and a connecting end wall and having one end normally open; a plurality of legs removably mounted on said container; a pair of upwardly extending opposed tracks secured to the open ends of the side walls; a U-shaped frame member having a bight portion journailed for rotation in the leg portions and the free ends of said leg portions having lugs thereon slidably engaging said tracks, and adapted to be secured in varying positions; an end section pivotally connected to the lugs of said frame member, said tracks providing for sliding upward and downward movement of said frame member and said end section being pivotally movable; adjustable means for pivoting said end section to said frame member for positioning and holding said end section at varying angular positions; a brace pivoted to said end section for holding said end section in varying extended positions, said brace slidably engaging the bight portion of said frame member; adjustable means on said bight portion for securing said brace in varying positions; a cover hinged to one end of said container and when closed being adapted to close the upper opening of said container and said end section; bracket arms on said cover adapted to hold same in extended open position; and a cradle adjustably and pivotally mounted in said container and adapted to hold an electric prime mover in varied angular positions relative to said end section and relative to the upper portions of said container.

References Cited in the file of this patent
UNITED STATES PATENTS

| | | |
|---|---|---|
| 2,697,460 | Barnett | Dec. 21, 1954 |
| 2,727,543 | Polselli | Dec. 20, 1955 |
| 2,759,507 | Davis et al. | Aug. 21, 1956 |
| 2,767,747 | Burrows | Oct. 23, 1956 |
| 2,786,500 | Unterfranz | Mar. 26, 1957 |